Oct. 10, 1944.        W. PECHY        2,359,786
CAN WEIGHING MACHINE
Filed June 27, 1941        3 Sheets-Sheet 1
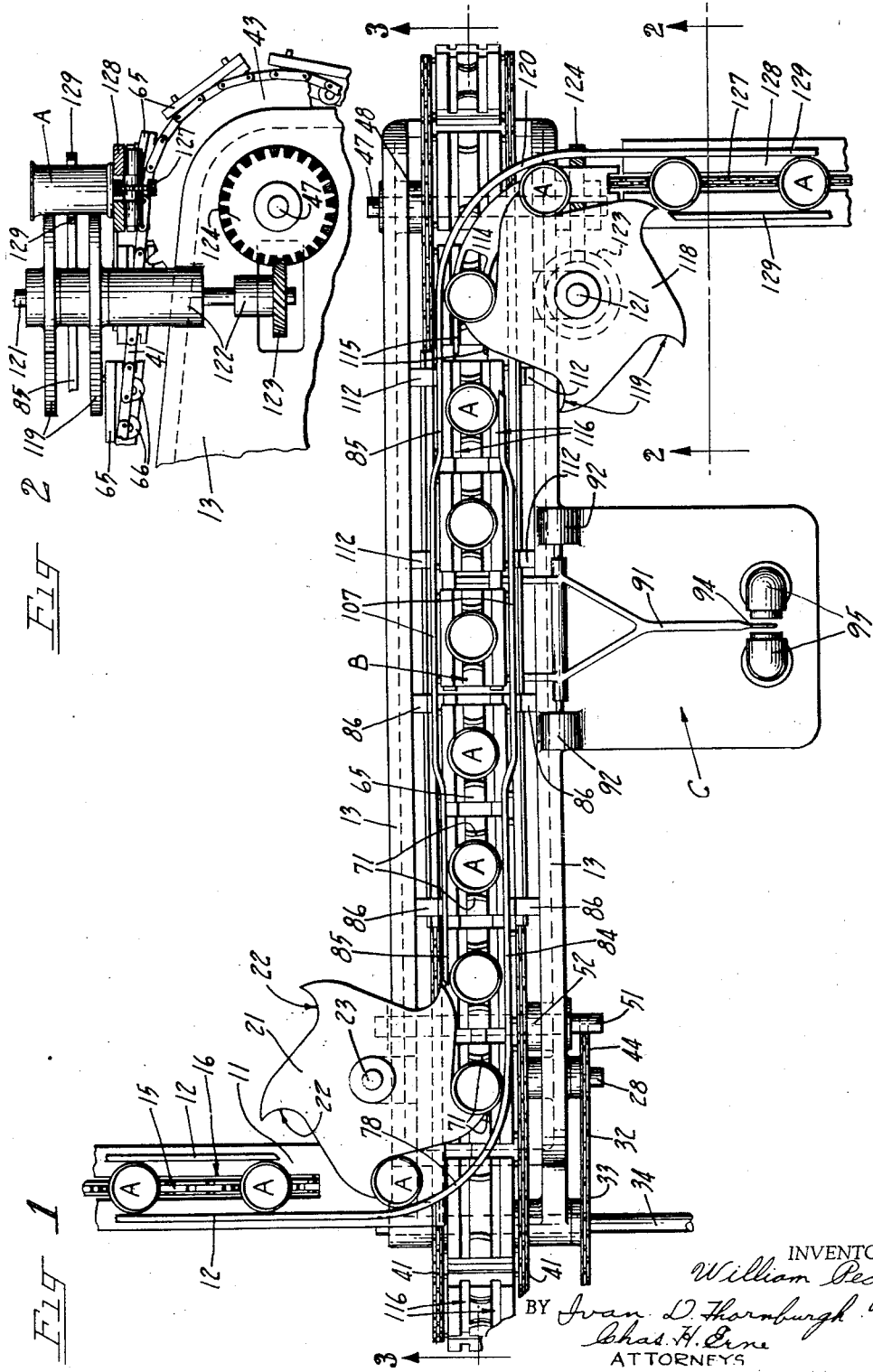

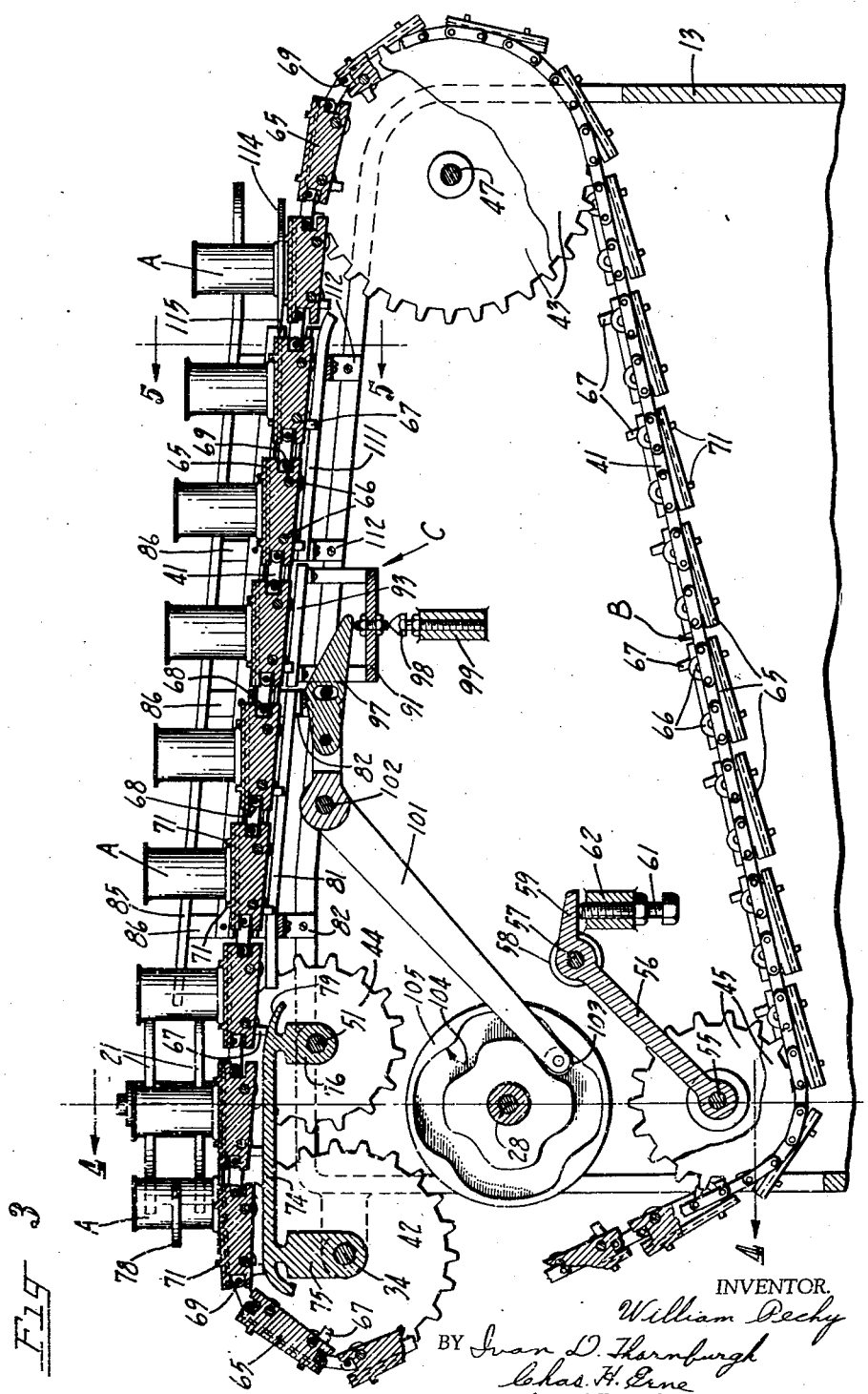

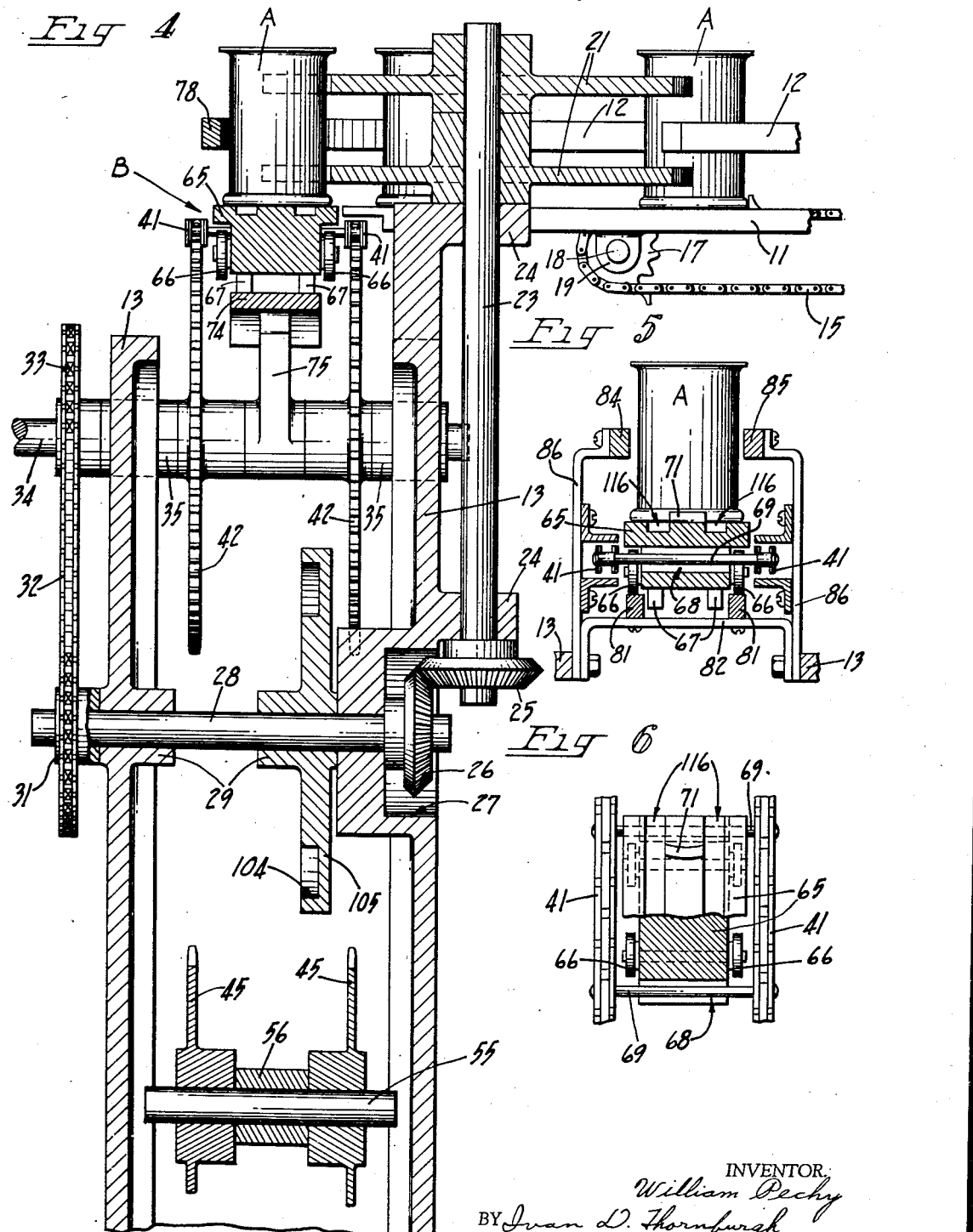

Patented Oct. 10, 1944

2,359,786

UNITED STATES PATENT OFFICE 2,359,786

CAN-WEIGHING MACHINE

William Pechy, Manasquan, N. J., assignor to American Can Company, New York, N. Y., a corporation of New Jersey Application June 27, 1941, Serial No. 400,090

7 Claims. (Cl. 198—39)

The present invention relates to a can weighing machine and has particular reference to such a machine having floating platforms for carrying filled open top cans in upright position onto and across a weighing beam for weighing. This is an improvement on the Can weighing machine disclosed in United States Patent 2,235,725, issued March 18, 1941, to Ronald E. J. Nordquist.

An object of the invention is the provision of a can weighing machine wherein filled open top cans to be tested for weight are carried in a continuous procession across a sensitive weighing device on floating can supporting platforms which permit of true and accurate weighing of each can.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a can weighing machine embodying the instant invention, with parts broken away;

Fig. 2 is a vertical sectional view taken substantially along the line 2—2 in Fig. 1, with parts broken away;

Fig. 3 is a longitudinal vertical section taken substantially along the line 3—3 in Fig. 1, with parts broken away;

Figs. 4 and 5 are enlarged vertical transverse sections taken substantially along the respective lines 4—4, and 5—5 in Fig. 3, with parts broken away; and Fig. 6 is an enlarged top plan view of a can support platform and a portion of the conveyor, with parts broken away and shown in section.

As a preferred embodiment of the invention the drawings illustrate principal parts of a can weighing machine of the character disclosed in the above mentioned Nordquist Patent. In the instant machine filled open top cans A are to be weighed to determine those which may be slack filled. The cans being filled and having the top open are received from any suitable source of supply in upright position and are carried through the machine in a continuous procession on a moving conveyor B while being maintained upright. During their passage through the machine the cans move across a weighing device C which checks their weight. The weighing device may control a discharge mechanism for diverting slack filled cans to one place of deposit while the properly filled cans are carried on to another place of deposit.

The filled cans A to be weighed are introduced into the machine preferably in spaced and timed order by way of a horizontal runway 11 (Fig. 1) having side guide rails 12 secured thereto for keeping the cans in line. The machine end of the runway is secured to one of a pair of side frames 13 which constitute the main frame of the machine. The cans are propelled along the runway by an endless chain entrance conveyor 15 (see also Fig. 4) which is disposed in an opening 16 in the floor of the runway. The machine end of the conveyor operates over an idler sprocket 17 mounted on a short shaft 18 carried in bearing blocks 19 which depend from the bottom of the runway. This conveyor may be operated in any suitable manner in time with the other moving parts of the machine.

Adjacent the machine end of the entrance conveyor 15 the entering cans A are engaged by a horizontally disposed star wheel 21 having spaced pockets 22 which transfer the cans from the runway to the main conveyor B. The star wheel is mounted on the upper end of a vertical shaft 23 which is journaled in a pair of spaced bearings 24 formed on the outside of one of the machine side frames 13. The shaft is continuously rotated by a bevel gear 25 which is carried on the lower end of the star wheel shaft.

The bevel gear 25 meshes with and is driven by a bevel gear 26 disposed in a recess 27 in the machine frame. Gear 26 is mounted on the outer end of a cam shaft 28 which is journaled in bearings 29 formed in the machine side frames 13. The opposite end of the cam shaft carries a sprocket 31 which is rotated by an endless chain 32 which operates over a driving sprocket 33 mounted on a main drive shaft 34 journaled in bearings 35 formed in the machine side frames. The drive shaft may be rotated in any suitable manner.

The conveyor B includes a pair of spaced and parallel endless chains 41 (Figs. 1, 3 and 4) which operate over a pair of driving sprockets 42, a pair of idler sprockets 43, a pair of levelling sprockets 44, and a pair of tightener sprockets 45. The driving sprockets 42 are located at the can entrance end of the machine and are mounted on and are driven by the main shaft 34. The idler sprockets 43 are located at the can discharge end of the machine and are mounted on a cross shaft 47 journaled in bearings 48 formed in the machine side frames.

The levelling sprockets 44 are located intermediate the sprockets 42, 43 and are mounted on a cross-shaft 51 journaled in bearings 52 in the machine side frames. These sprockets 42, 43, 44 are located adjacent the top of the machine and are arranged so that the upper run of the conveyor B is horizontal and level in operating from the driving sprockets 42 to the levelling sprockets 44 but extends down on a declining angle from sprockets 44 to where the conveyor takes over the idler sprockets 43.

The tightener sprockets 45 are located adjacent the lower run of the conveyor B and are mounted on a short shaft 55 carried in one end of a lever 56. The lever is mounted on a pivot shaft 57 carried in bearings 58 formed in the side frames 13. Adjacent the pivot shaft 57, the lever is formed with a lug 59 which engages against an adjustable tightening screw 61 threaded in a boss 62 on one of the side frames 13. Adjustment of this screw tightens or loosens, as the case may be, the sprockets 45 against the conveyor chains 41 and thus keeps the conveyor B in a taut condition.

The conveyor chains 41 which operate over these sprockets carry a plurality of floating platforms 65 which receive and support the cans A in upright position during their passage through the machine. Adjacent the bottom, each platform is provided with a plurality of rollers 66. A pair of depending lugs 67 are located adjacent the rollers and form an integral part of the rear end of each platform. The ends of the platforms are formed with a horizontal transverse clearance groove 68 in which cross bars 69 are loosely disposed. There are two of these bars for each platform and they extend across the space between the conveyor chains 41 and thus retain the platform in place relative to the chains. The outer ends of the cross bars are secured in the chains and these cross bars help to carry the platforms through the machine along with the conveyor.

The clearance grooves 68 in the ends of the platforms 65 are located in such a manner that when the platforms are propelled along the inclined portion of the upper run of the conveyor B, the top surface of the platforms will be level. This top surface of the platforms is formed with a pair of spaced outwardly curved lugs 71 for holding a can in place on the platform.

When a platform 65 is carried up into position adjacent the can entrance end of the machine as the conveyor chains travel up over the drive sprockets 42, the depending lugs 67 on the platform ride up onto a lifter bar 74. This action lifts the rear end of the platform while its front end rests on the front cross bar 69. This brings the top surface of the platform into a horizontal or level position to receive a filled can to be weighed. The lifter bar is formed with a pair of depending support legs 75, 76 which respectively surround the drive shaft 34 and the levelling sprocket shaft 51. These legs hold the lifter bar in place.

As the raised platform 65 is propelled further along the lifter bar 74 in this position, it passes the feed-in star wheel 21. During this travel of the platform the star wheel transfers a filled can A in its upright position from the runway 11 onto the platform and locates the can between the holding lugs 71 on the platform. A curved extension 78 of the guide rail 12 guides the can into position onto the platform.

The platform and its received can continue along with the conveyor and as the latter passes over the levelling sprockets 44 and begins to move along the declining portion of the conveyor, the depending lugs 67 on the platform ride off the lifter bar 74 over a downwardly curved end 79 (Fig. 3) and this lets the back end of the platform settle down gradually until it rests on the rear cross bar 69.

As the platform is propelled along this sloping portion of the conveyor it rolls along a pair of longitudinal tracks 81 (Figs. 3 and 5). These tracks are secured to transverse supports 82 bolted to the side frames 13. The can is also guided by side guides 84, 85 which are secured to uprights 86 bolted to the side frames 13. The side guide 84 is a continuation of the curved guide rail 78.

Near the middle of the machine, the platform tracks 81 terminate, this being adjacent the can weighing device C. This device includes a weighing beam 91 (Figs. 1 and 3) which is sensitively balanced and pivoted on knife edges housed in pivot blocks 92. The inner end of the beam carries a pair of platform tracks 93 which have a slope corresponding to the conveyor B and which align longitudinally with the tracks 81. The outer end of the beam carries a shutter 94 which is disposed between a pair of cooperating photo-electric cells 95 which control a slack can throw-out device of the character disclosed in the above mentioned Nordquist patent.

The weighing beam tracks 93 are normally maintained even with the terminal ends of the tracks 81 by a beam locking arm 97 which holds the beam against an adjustable setscrew 98 threaded in a boss 99 formed on one of the side frames 13. The locking arm is adjustably secured in a lever 101 mounted on a pivot shaft 102 carried in suitable bearings in the side frames. The lever carries a cam roller 103 which operates in a cam groove 104 of a face cam 105 mounted on and rotated by the cam shaft 28.

The platform tracks 81 are elevated slightly adjacent the tracks 93 of the weighing beam 91 so that the platform will be raised sufficiently relative to the conveyor chains 41 to bring the cross bars 69 into the middle of the clearance grooves 68 in the platform so that the bars are clear of the platform. The full weight of the platform and the can is then on the tracks and not on the chains. In this condition the platform rolls off of the tracks 81 and enters upon the tracks 93 of the weighing beam. The platform rolls freely across the beam tracks 93. During this passage across the beam tracks, the cross bars are free of the platform in their clearance grooves 68 so that no rubbing of the conveyor takes place to influence the weighing action which takes place on the beam.

When the platform rollers 66 are fully on the tracks 93 of the weighing beam the locking arm 97 controlled by the lever 101 and cam 105 release the beam for a weighing operation as the platform bearing its can rolls across the beam smoothly and uninfluenced. In order to insure freedom of the can during weighing, the guide rails 84, 85 are formed with clearance sections 107.

After the weighing operation the weighing beam is again locked by the lever 101 against movement and the platform rolls off of the beam tracks 93 and onto a pair of continuing stationary tracks 111. These tracks are secured to cross brackets 112 which are bolted to the side frames 13. The platform rolls along these tracks toward the discharge end of the machine.

Adjacent the discharge end of the machine, the platform 65 passes under a curved runway table 114 (Figs. 1 and 3) which is secured to the machine frame. The inner end of the table is formed with a pair of spaced prongs 115 which as the platform passes under the table enter into clearance slots 116 formed in the top of the platform (see also Figs. 5 and 6). These prongs pick up the weighed can A and remove it from the platform as the latter passes under the table.

The removed can A is propelled along the curved table 114 by a rotating discharge star wheel 118 having spaced pockets 119 for receiving and for advancing the cans. The cans are retained in the turret pockets by a curved extension 120 of the guide rail 85. The star wheel is mounted on the upper end of a vertical shaft 121 (see also Fig. 2) which is journaled in a pair of spaced bearings 122 formed on the machine frame. The shaft is rotated in time with the other moving parts of the machine by a helical gear 123 which is mounted on the lower end of the shaft. This gear meshes with and is driven by a helical gear 124 which is carried on the idler sprocket shaft 47.

The discharge star wheel 118 advances the can into the grip of an endless chain discharge conveyor 127 which is disposed at right angles to the machine frames 13. The discharge conveyor is located in a runway 128 along which the cans are propelled to any suitable place of deposit. Guide rails 129 secured to the runway keep the cans moving therealong in a straight line. The conveyor may be operated in any suitable manner in time with the other moving parts of the machine.

Separation of the slack filled cans from the full weight cans may be effected in any suitable manner similar for example to that disclosed in the Nordquist patent supra. Since this feature forms no part of the instant invention a disclosure of the devices required is omitted.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can weighing machine, the combination of a can weighing beam disposed at a fixed can weighing station, an endless conveyor operating across and relative to said weighing beam free of contact therewith, a can carrying platform mounted on and loosely disposed in said conveyor and engageable with said beam for supporting a can to be weighed by the beam, and horizontally disposed transverse clearance grooves located at opposite ends of each of said platforms through which grooves the associated conveyor mounting means of the respective platforms extend without supporting contact with the platforms while the latter are in engagement with said beam, so that the platforms will move across the weighing beam free of engagement with the conveyor during the can weighing operation.

2. In a can weighing machine, the combination of a can weighing beam, an inclined endless conveyor operating across said weighing beam free of contact therewith and having spaced pockets defined by transversely spaced cross bars on said conveyor, a can carrying platform loosely confined within each pocket of said conveyor in a level position for supporting an open top can in an upright position, said platforms being successively engageable with said beam, feeding devices for placing the cans on the platform, means for retaining the platforms in a horizontal plane while receiving the cans, and horizontally disposed transverse clearance openings located at opposite ends of said platforms adjacent said cross bars, so that said platforms will pass across the weighing beam free of supporting contact with the conveyor cross bars during a can weighing operation.

3. In a can weighing machine, the combination of a can weighing beam, an inclined endless conveyor operating across said weighing beam free of contact therewith and having spaced pockets therein, said pockets being defined by transversely spaced cross bars on said conveyor, a can carrying platform loosely confined within each pocket of said conveyor in a level position for supporting an open top can in an upright position, each of said platforms having horizontally disposed transverse openings located at opposite ends thereof for receiving a pair of adjacent cross bars, feeding devices for placing the cans on the platforms, means on said platforms for holding the received cans against displacement, rollers on said platforms so that the latter are successively engaged with and supported by the weighing beam for a can weighing operation, said platform openings being free of contact with its associated conveyor cross bars while said platform is supported by said beam, and means for removing the weighed cans from the inclined conveyor.

4. In a can weighing machine, the combination of a can weighing beam, a pair of spaced and parallel endless conveyor chains extending across said beam free of contact therewith, transverse cross bars spaced along and connecting said chains and setting off a series of pockets, a platform disposed in each of said pockets for carrying a can to be weighed, each of said platforms having transverse clearance grooves in opposite ends to loosely confine corresponding adjacent cross bars of said conveyor chains so that the platforms move with said conveyor chains over said weighing beam, and rollers carried by said platforms and having rolling contact with said weighing beam for holding the platforms free of said conveyor cross bars during the can weighing operation by said weighing beam.

5. In a can weighing machine, the combination of a can weighing beam, an endless conveyor operating across said weighing beam and having spaced pockets therein, a can carrying platform loosely confined within each pocket of said conveyor for supporting a can to be weighed, tracks adjacent said conveyor for supporting said platforms, continuing tracks on said weighing beam, rollers on said platforms so that they will roll across the weighing beam tracks free of the conveyor during the can weighing operation, and means for holding said weighing beam against movement until one of said platforms has completely passed into roller contact therewith.

6. In a can weighing machine, the combination of a continuously moving endless conveyor extending along a horizontal path of travel and thence along an inclined path of travel, can carrying platforms loosely confined in said conveyor in a level position when traveling along the inclined path of travel for supporting open top cans, levelling lugs on said platforms, a stationary lifter bar disposed adjacent the horizontal path of travel of the conveyor and engageable by said lugs for maintaining the platforms in a level position while passing along this horizontal path of travel so that the cans may be placed on the platforms, a can weighing beam located adjacent the conveyor along its inclined path of travel, and rollers on said platforms so that the latter are successively engaged with and supported by the weighing beam, to prevent supporting engagement of said platforms with said conveyor during a can weighing operation.

7. In a can weighing machine for weighing open top cans in a vertical position, the combination of a can weighing beam having an inclined upper surface, an endless conveyor operable across and free of contact with said beam, a can carrying platform having a horizontal upper surface for supporting the open top cans in a vertical position, said platform being movably supported by said conveyor and having loose engagement therewith, and means for causing said platform to be freed from the influence of said conveyor while passing along the inclined upper surface of said weighing beam for accurately weighing the open top can carried thereby.

WILLIAM PECHY.